United States Patent
Nagai et al.

(10) Patent No.: US 8,417,841 B2
(45) Date of Patent: Apr. 9, 2013

(54) COMMUNICATION SYSTEM, HOST DEVICE, AND TERMINAL DEVICE

(75) Inventors: Tadakazu Nagai, Tokyo (JP); Kazushige Taniguchi, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 196 days.

(21) Appl. No.: 12/575,657

(22) Filed: Oct. 8, 2009

(65) Prior Publication Data

US 2010/0095026 A1    Apr. 15, 2010

(30) Foreign Application Priority Data

Oct. 10, 2008  (JP) .................... 2008-264386

(51) Int. Cl.
*G06F 3/00*  (2006.01)
(52) U.S. Cl.
USPC .................... 710/16; 710/15; 710/17; 710/18; 710/19
(58) Field of Classification Search .................. None
See application file for complete search history.

(56) References Cited

U.S. PATENT DOCUMENTS

| | | | | |
|---|---|---|---|---|
| 5,479,479 A * | 12/1995 | Braitberg et al. | ........... | 455/404.1 |
| 5,799,255 A * | 8/1998 | Berg et al. | ............ | 455/551 |
| 6,012,105 A * | 1/2000 | Rubbmark et al. | ........... | 710/14 |
| 6,097,943 A * | 8/2000 | Nordwall | ............ | 455/418 |
| 6,097,967 A * | 8/2000 | Hubbe et al. | ........... | 455/558 |
| 6,161,027 A * | 12/2000 | Poirel | ........... | 455/572 |
| 6,725,061 B1 * | 4/2004 | Hutchison et al. | ........... | 455/557 |
| 7,050,783 B2 * | 5/2006 | Curtiss et al. | ........... | 455/404.1 |
| 7,299,304 B2 * | 11/2007 | Saint-Hilaire et al. | ........... | 710/11 |
| 7,524,708 B2 * | 4/2009 | Song et al. | ........... | 438/150 |
| 7,551,894 B2 * | 6/2009 | Gerber et al. | ........... | 455/41.2 |
| 2004/0224638 A1 * | 11/2004 | Fadell et al. | ........... | 455/66.1 |
| 2006/0063511 A1 * | 3/2006 | Shima et al. | ........... | 455/410 |
| 2006/0258289 A1 * | 11/2006 | Dua | ........... | 455/41.3 |
| 2007/0033285 A1 * | 2/2007 | Shiigi et al. | ........... | 709/227 |
| 2007/0112997 A1 * | 5/2007 | Watanabe | ........... | 710/313 |
| 2007/0286144 A1 * | 12/2007 | Miyake | ........... | 370/338 |
| 2008/0036879 A1 * | 2/2008 | Hashimoto | ........... | 348/231.99 |
| 2008/0039017 A1 * | 2/2008 | Kim | ........... | 455/41.2 |
| 2008/0055396 A1 * | 3/2008 | Shiue et al. | ........... | 348/14.01 |
| 2008/0256205 A1 * | 10/2008 | Mahoney | ........... | 709/206 |
| 2009/0055510 A1 * | 2/2009 | Svendsen | ........... | 709/217 |
| 2009/0119427 A1 * | 5/2009 | Takahashi | ........... | 710/106 |

* cited by examiner

*Primary Examiner* — Henry Tsai
*Assistant Examiner* — Jing-Yih Shyu
(74) *Attorney, Agent, or Firm* — Katten Muchin Rosenman LLP

(57) ABSTRACT

Provided is a host device (10), which can establish a communication connection with a terminal device (20) and can be connected to a peripheral device (30), including a first communication section and a second communication section, via the first communication section. The host device (10) transmits information for identifying the terminal device (20) acquired from the terminal device (20) to the peripheral device (30) as communication destination identification information that allows the peripheral device (30) to identify a communication partner in a case of performing communications via the second communication section, when the host device (10) is connected to the terminal device (20) and connected to the peripheral device (30) via the first communication section.

7 Claims, 4 Drawing Sheets

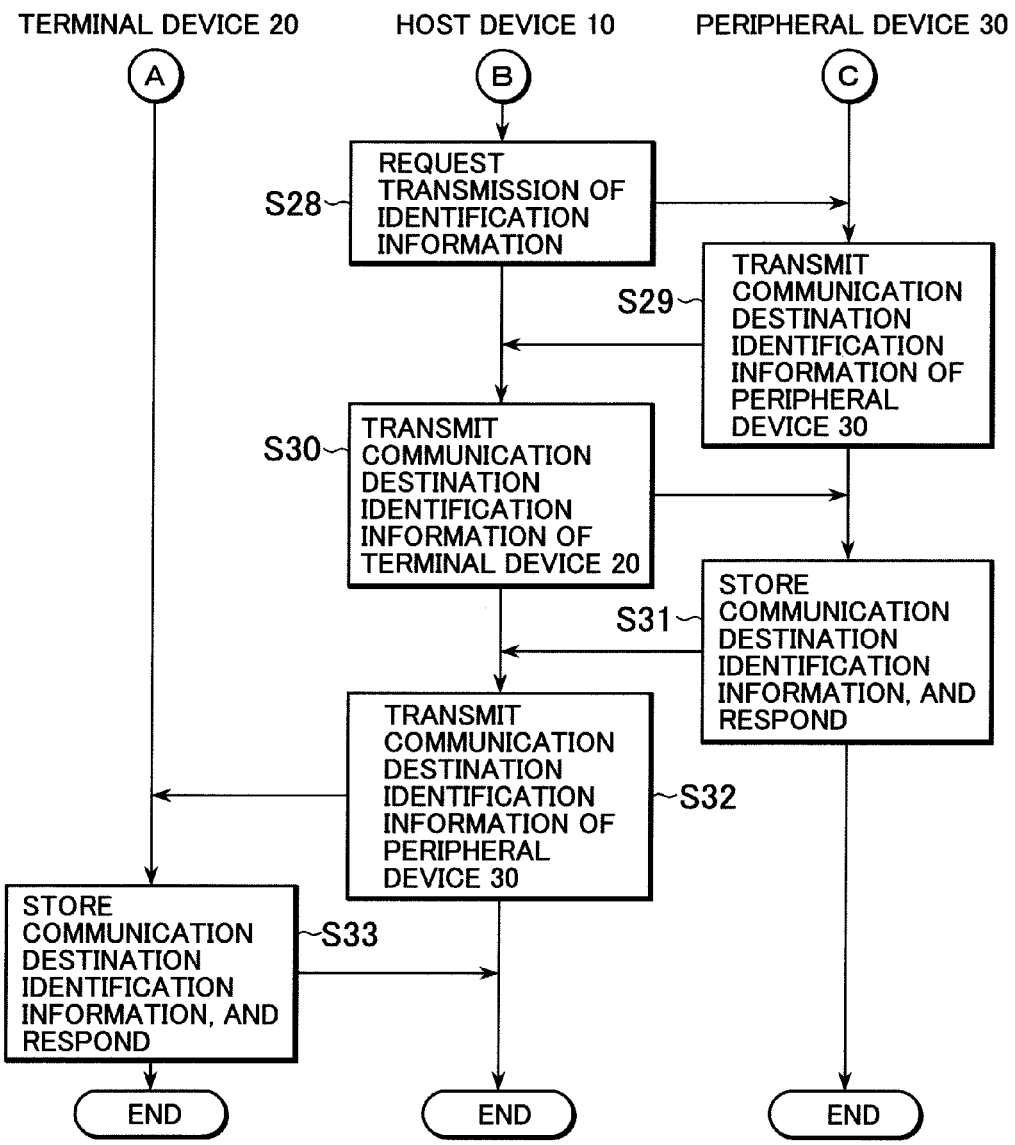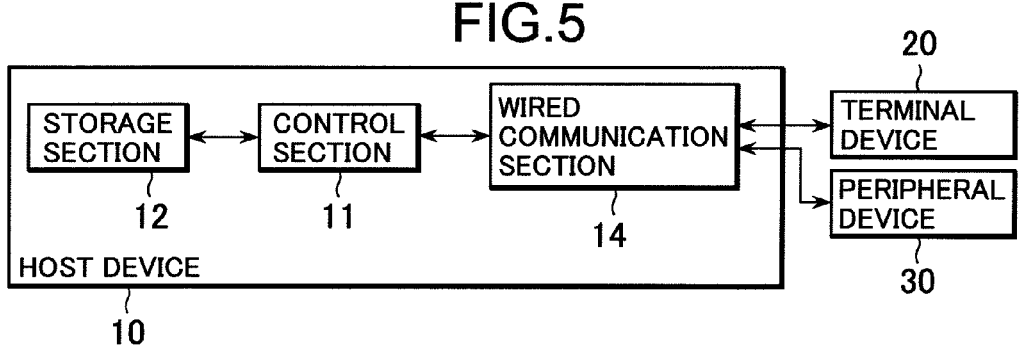

COMMUNICATION SYSTEM, HOST DEVICE, AND TERMINAL DEVICE

BACKGROUND OF THE INVENTION

1. Field of the Invention

The present invention relates to a host device configured to be capable of establishing a communication connection with a peripheral device, a terminal device thus configured, a communication system including the above-mentioned devices, a communication control method, and an information storage medium.

2. Description of the Related Art

In a case where a communication device performs communications with another communication device, it is necessary for the communication device to first acquire information for identifying a communication partner (such as identification information of the device and a network address) depending upon a communication standard or a connected state in, for example, wireless communications or communications via a network to which a large number of communication devices are connected. As a specific example, in a case where a host device and a peripheral device perform communications based on a Bluetooth (registered trademark) standard, a pairing processing of exchanging their Bluetooth device addresses as communication destination identification information that allows one party to identify the other party as the communication partner is executed in advance. As an example of a method of thus acquiring the communication destination identification information that allows the peripheral device to identify the host device as the communication partner, there is a method of transmitting the communication destination identification information from the host device to the peripheral device by directly connecting the peripheral device to the host device by communication means other than the Bluetooth standard (such as a USB interface). In this example, the peripheral device is configured to be capable of establishing a communication connection with the host device by both a first communication section such as a universal serial bus (USB) interface and a second communication section such as a wireless communication interface based on the Bluetooth standard, and the communication destination identification information necessary to establish a communication connection with the host device via the second communication section is acquired from the host device by the communication connection established via the first communication section.

There is also a communication device (hereinafter, referred to as "terminal device"), such as a portable information terminal or a portable game machine, which cannot realize the communication connection with the peripheral device established via the above-mentioned first communication section under constraints in terms of implementation, or for some other such reason. In this case, even if including an interface that implements the second communication section, the terminal device cannot provide the peripheral device with the communication destination identification information necessary to perform communications via the second communication section.

SUMMARY OF THE INVENTION

The present invention has been made in view of the above-mentioned circumstances, and therefore an object thereof is to provide a communication system, a host device, a terminal device, a communication control method, and an information storage medium, each of which serves to realize a communication connection established via a second communication section provided between a terminal device and a peripheral device that uses a first communication section to acquire information identifying a partner in communications performed via the second communication section without establishing a direct communication connection between the terminal device and the peripheral device via the first communication section.

A communication system according to the present invention includes: a host device; a terminal device that can establish a communication connection with the host device; and a peripheral device including: a first communication section that can be connected to the host device; and a second communication section that can be connected to the terminal device, in which: the terminal device includes a section for transmitting information for identifying the terminal device to the host device as communication destination identification information that allows the peripheral device to identify a communication partner in a case of performing communications via the second communication section; the host device includes a communication destination identification information transmitting section for transmitting the information for identifying the terminal device to the peripheral device as the communication destination identification information when the host device is connected to the terminal device and connected to the peripheral device via the first communication section; and the peripheral device further includes a section for establishing a communication connection via the second communication section with the communication partner identified by the communication destination identification information transmitted by the communication destination identification information transmitting section.

In the communication system, the peripheral device may be further connected to the host device via the second communication section, and the communication destination identification information transmitting section of the host device may transmit information for identifying the host device to the peripheral device as the communication destination identification information when the host device is connected to the peripheral device via the first communication section without being connected to the terminal device.

In addition, a host device according to the present invention may establish a communication connection with a terminal device and may be connected to a peripheral device, that includes a first communication section and a second communication section, via the first communication section. The host device includes a communication destination identification information transmitting section for transmitting information for identifying the terminal device acquired from the terminal device to the peripheral device as communication destination identification information that allows the peripheral device to identify a communication partner in a case of performing communications via the second communication section, when the host device is connected to the terminal device and connected to the peripheral device via the first communication section.

The host device may be connected to the peripheral device via the second communication section, and the communication destination identification information transmitting section may transmit information for identifying the host device to the peripheral device as the communication destination identification information when the host device is connected to the peripheral device via the first communication section without being connected to the terminal device.

Further, the communication destination identification information transmitting section may acquire information that allows the host device to identify the peripheral device as the communication partner in the case of performing the communications via the second communication section, from the peripheral device when the host device is connected to the peripheral device via the first communication section without being connected to the terminal device, and the communication destination identification information transmitting section may transmit, to the terminal device, the information that allows the terminal device to identify the peripheral device as the communication partner in the case of performing the communications via the second communication section, and has been acquired from the peripheral device, when the host device is connected to the peripheral device via the first communication section while being connected to the terminal device.

In addition, in the host device, the communication destination identification information transmitting section may transmit the information for identifying the terminal device to the peripheral device as the communication destination identification information when the host device is connected to the peripheral device via the first communication section while being connected to the terminal device operating in a predetermined operation mode.

In addition, a terminal device according to the present invention includes: a first communication section that can be connected to a host device; a second communication section that can be connected to a peripheral device; and a notifying section for transmitting information for identifying the terminal device to the host device as communication destination identification information that allows the peripheral device to identify a communication partner in a case of performing communications via the second communication section, when the terminal device is connected to the host device.

In addition, the terminal device may operate in one of a plurality of operation modes including a connection operation mode for notifying the peripheral device of the communication destination identification information, according to a user's instruction operation, and may further include a section for changing, according to the one of the plurality of operation modes, information indicating a type of the terminal device, which is to be transmitted to the host device when the terminal device is connected to the host device. The notifying section may transmit the information for identifying the terminal device to the host device as the communication destination identification information when the terminal device is connected to the host device in the connection operation mode.

In addition, a communication control method according to the present invention is performed by a host device that can establish a communication connection with a terminal device and can be connected to a peripheral device, comprising a first communication section and a second communication section, via the first communication section. The communication control method includes transmitting information for identifying the terminal device acquired from the terminal device to the peripheral device as communication destination identification information that allows the peripheral device to identify a communication partner in a case of performing communications via the second communication section, when the host device is connected to the terminal device and connected to the peripheral device via the first communication section.

In addition, a computer-readable information storage medium according to the present information stores thereon a program for causing a host device that can establish a communication connection with a terminal device and can be connected to a peripheral device, comprising a first communication section and a second communication section, via the first communication section, to function as a communication destination identification information transmitting section for transmitting information for identifying the terminal device acquired from the terminal device to the peripheral device as communication destination identification information that allows the peripheral device to identify a communication partner in a case of performing communications via the second communication section, when the host device is connected to the terminal device and connected to the peripheral device via the first communication section.

BRIEF DESCRIPTION OF THE DRAWINGS

In the accompanying drawings:

FIG. 4 is a flowchart illustrating the example of the pairing processing between the terminal device and the peripheral device; and FIG. 5 is a block diagram illustrating another configuration example of the host device according to the embodiment of the present invention.

DETAILED DESCRIPTION OF THE INVENTION

Hereinafter, detailed description is given of an embodiment of the present invention, with reference to the accompanying drawings.

Figure 1:
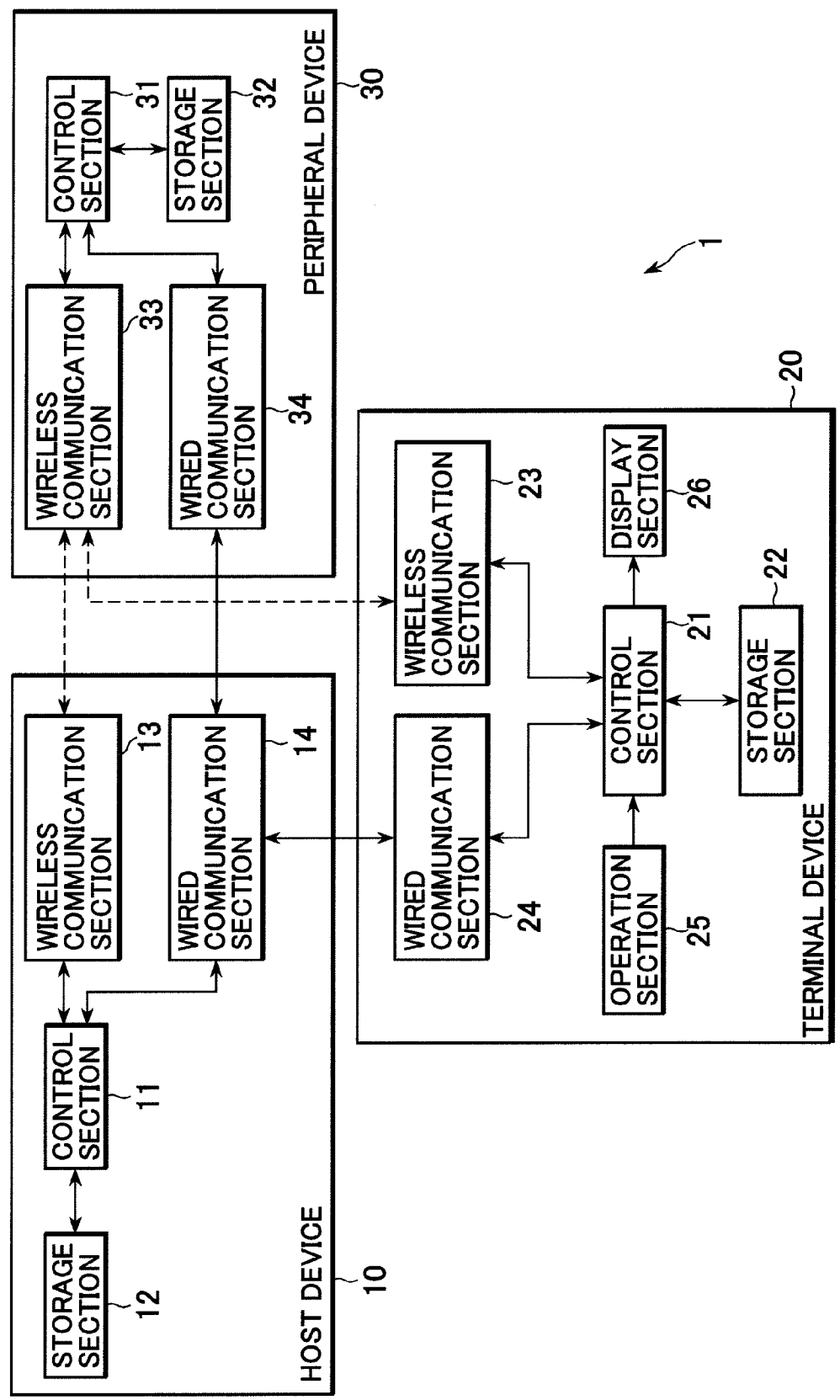
FIG. 1 is a block diagram illustrating a configuration of a communication system including a host device and a terminal device according to an embodiment of the present invention.

FIG. 1 is a block diagram illustrating a configuration of a communication system 1 including a host device and a terminal device according to one embodiment of the present invention. As illustrated in FIG. 1, the communication system 1 includes a host device 10, a terminal device 20, and a peripheral device 30.

The host device 10 is an information processing device such as a personal computer or a home-use game machine, and includes a control section 11, a storage section 12, a wireless communication section 13, and a wired communication section 14. In addition, the terminal device 20 is an information processing device such as a portable game machine, and includes a control section 21, a storage section 22, a wireless communication section 23, a wired communication section 24, an operation section 25, and a display section 26. Further, the peripheral device 30 is any one of various devices that operate in conjunction with the host device 10 and the terminal device 20. Examples of the devices include a keyboard, a mouse, a controller of the home-use game machine, and a headphone. The peripheral device 30 includes a control section 31, a storage section 32, a wireless communication section 33, and a wired communication section 34.

Each of the control sections 11, 21, and 31 is, for example, a microprocessor or the like, and executes each of various information processing according to a program stored in the corresponding storage section. Specific examples of processing executed by the respective control sections 11, 21, and 31 in this embodiment are described later.

Each of the storage sections 12, 22, and 32 includes a memory device such as a RAM or a ROM or a hard disk drive, and stores therein a program executed by the corresponding control section, and various kinds of data. In addition, each of the storage sections 12, 22, and 32 operates as a work memory for the corresponding control section. Note that each of the storage sections 12, 22, and 32 includes a nonvolatile memory whose storage contents are retained without being erased even after power shutdown, and a temporary memory whose storage contents are erased after power shutdown.

The wireless communication sections 13, 23, and 33 are each a wireless communication interface based on a Bluetooth standard, and perform transmission/reception of information to/from another device without the intermediation of a transmission line. In this embodiment, the wireless communication sections 13, 23, and 33 correspond to a second communication section of the host device 10, the terminal device 20, and the peripheral device 30, respectively. In this embodiment, wireless communications based on the Bluetooth standard are executed between the peripheral device 30 and one of the host device 10 and the terminal device 20.

The wired communication sections 14, 24, and 34 are each a wired communication interface based on a USB standard, and perform transmission/reception of information to/from another device through the intermediation of a transmission line such as a connection cable. In this embodiment, the wired communication sections 14, 24, and 34 correspond to a first communication section of the host device 10, the terminal device 20, and the peripheral device 30, respectively. Note that in this embodiment, the host device 10 operates as a USB host, while the terminal device 20 and the peripheral device 30 each operate as a USB device. That is, the host device 10 can be connected to each of the terminal device 20 and the peripheral device 30 via the wired communication section 14, but the terminal device 20 and the peripheral device 30 are not connected to each other via the wired communication section 24 or 34. In addition, the wired communication section 14 that operates as a USB host may have a function of supplying power to a connected device via a USB connection cable. Accordingly, the host device 10 can also perform recharging of the terminal device 20 and the peripheral device 30.

The operation section 25 includes an input device such as a button, and outputs contents of an instruction operation performed by a user to the control section 21. In addition, the display section 26 includes a liquid crystal panel or the like, and displays various information to be presented to the user on a display screen based on an instruction issued by the control section 21.

In a case where, in the above-mentioned communication system 1, the peripheral device 30 performs wireless communications with any one of the host device 10 and the terminal device 20 to thereby transmit/receive information thereto/therefrom, pairing processing needs to be performed in advance between the peripheral device 30 and a partner device with which the peripheral device 30 is to perform the wireless communications. The pairing processing is a processing of exchanging information that allows one of devices that perform wireless communications to identify the other as a communication partner (hereinafter, referred to as "communication destination identification information"). Accordingly, both the devices can identify the partner device as a connection destination for wireless communications, and execute the wireless communications. Once pairing with the peripheral device 30 is performed, until the pairing is canceled, the host device 10 or the terminal device 20 subjected to the pairing is kept ready to accept a wireless communication connection from the peripheral device 30. In addition, once the pairing is performed, as the need for a wireless communication connection arises, the peripheral device 30 automatically establishes a wireless communication connection with the host device 10 or the terminal device 20 subjected to the pairing.

In this embodiment, the pairing processing between the host device 10 and the peripheral device 30 is executed with the host device 10 and the peripheral device 30 being connected to each other via the wired communication sections 14 and 34. Meanwhile, as described above, the terminal device 20 and the peripheral device 30 are not directly connected by wire. Therefore, the pairing processing between the terminal device 20 and the peripheral device 30 is executed through the intermediation of the host device 10 with both the terminal device 20 and the peripheral device 30 being wire connected to the host device 10. That is, when wire connected to the peripheral device 30 via the wired communication section 14, the host device 10 needs to perform a selection depending upon the user's intention as to which of the pairing processing between the peripheral device 30 and the host device 10 itself and pairing relay processing of relaying the pairing between the terminal device 20 and the peripheral device 30 is to be performed.

It is possible for the selection to be performed by the user's explicit instruction operation. However, in a case where, for example, the host device 10 and the peripheral device 30 are a home use-game machine and an operation device for operating the host device 10, respectively, even in such a situation is expected that it will be difficult for the user to perform an instruction operation with respect to the host device 10 in a state in which the peripheral device 30 is not paired with the host device 10. Therefore, in this embodiment, the host device 10 is configured to make a selection, depending upon an order in which devices are connected to the wired communication section 14, as to which of the pairing processing for the host device 10 itself and the pairing relay processing for the terminal device 20 is to be executed. That is, if the host device 10 is connected to the peripheral device 30 in a state in which the terminal device 20 is not wire connected to the host device 10, the host device 10 executes the pairing processing between the host device 10 itself and the peripheral device 30. Meanwhile, if the host device 10 is connected to the peripheral device 30 with the terminal device 20 being wire connected to the host device 10 in advance, the host device 10 executes the pairing relay processing of relaying the paring between the terminal device 20 and the peripheral device 30, which is described later. Accordingly, the host device 10 can appropriately select any one of the pairing processing and the pairing relay processing depending upon the state in which the devices are connected to the wired communication section 14. In addition, the user's instruction operation with respect to the operation device such as a button becomes unnecessary, and hence the pairing processing or the pairing relay processing is executed by a device driver program or the like with another device being connected to the wired communication section 14 as a trigger even if, for example, the host device 10 is executing other processing.

Hereinafter, description is given of a specific example of a flow of the pairing processing executed in the communication system 1. Processing described hereinbelow is realized by, for example, the control section 11 of the host device 10, the control section 21 of the terminal device 20, and the control section 31 of the peripheral device 30 executing the programs stored in the storage sections 12, 22, and 32, respectively. Those programs may be provided by being stored on various computer-readable information storage media such as an optical disk and a memory card, or may be provided via a communication network such as the Internet. Note that the following description refers to principal parts of the flows of the processing, omitting description of some intermediate processing. In addition, in the following flows illustrated in the respective drawings, communications performed between the respective devices are all executed by wired communication.

Figure 2:
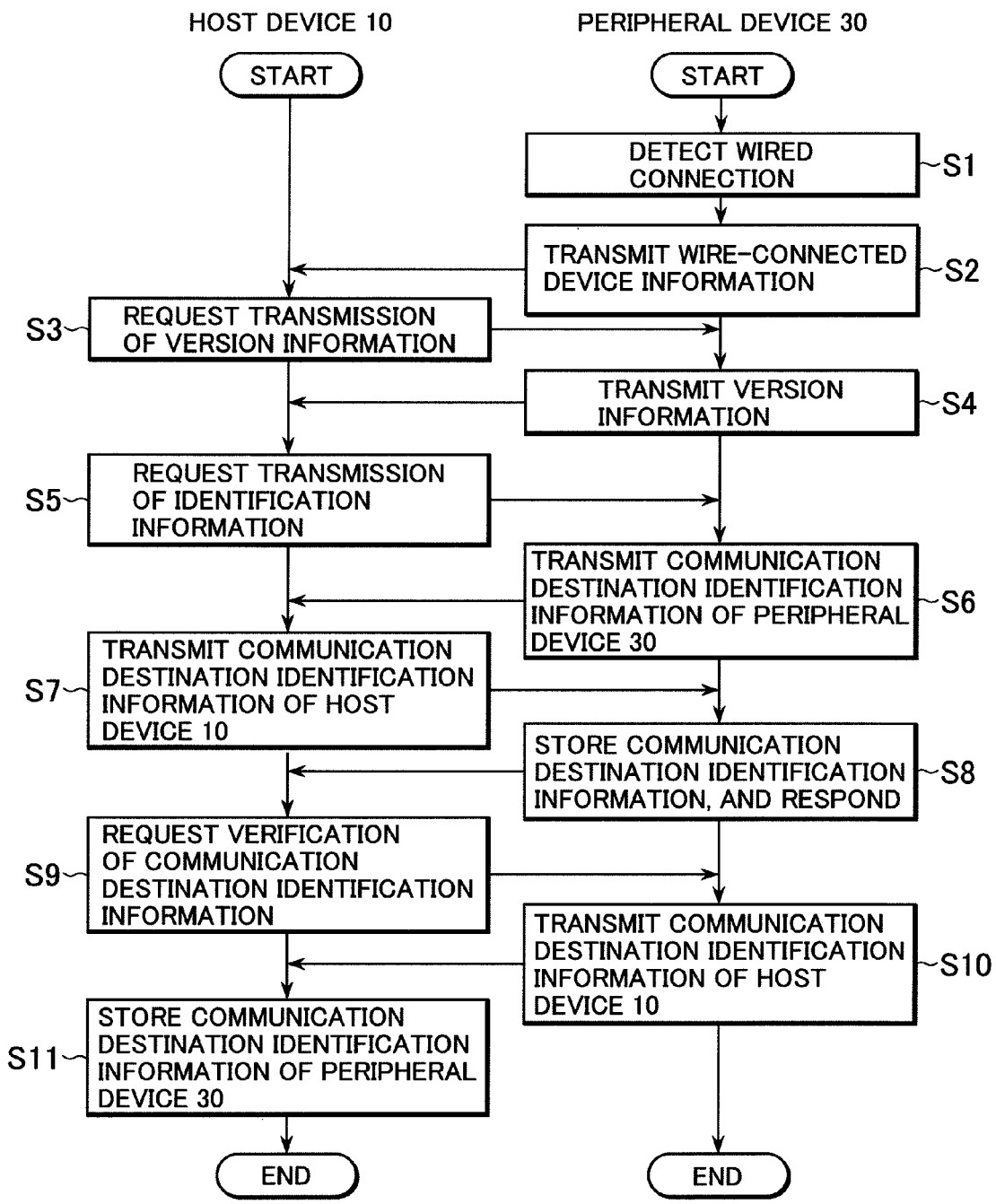
FIG. 2 is a flowchart illustrating an example of pairing processing between the host device and a peripheral device.

First described with reference to a flowchart of FIG. 2 is an example of the pairing processing executed between the host device 10 and the peripheral device 30.

For example, when the user connects the peripheral device 30 and the host device 10 by using a USB cable, the peripheral device 30 thereby detects that the peripheral device 30 itself has been wire connected to another communication device (S1). In response thereto, the peripheral device 30 transmits wire-connected device information to the host device 10 according to a general protocol for a USB connection (S2). The wire-connected device information includes information on the peripheral device 30 itself, and is transmitted in order to notify a wire-connected communication partner device of the type and the like of the connected device. To be specific, for example, the wire-connected device information includes information on provider/vendor of the device and on a model of the device and information on a class of the device in terms of the USB standard.

Note that the host device 10 may be configured so that the processing steps described heretofore are executed by a device driver program for a USB network interface or the like, and the subsequent processing steps are executed by a device driver program compatible with the peripheral device 30 or other such program, which is called by the above-mentioned device driver program for a USB network interface or other such program. For example, in a case where the wire-connected device information transmitted in Step S2 includes information indicating that the peripheral device 30 is of a human interface devices (HID) class, the host device 10 executes a device driver program corresponding to the HID class to thereby realize the subsequent processing steps. To be specific, the host device 10 uses the information on the provider/vendor of the device and on the model of the device, which is transmitted in Step S2, to judge whether or not the type of the connected device is a predefined pairing subject device (here, the peripheral device 30). If the connected device is not the pairing subject device, the host device 10 performs processing to be executed when another USB-connected device is connected thereto. Meanwhile, if the connected device is the pairing subject device, the pairing processing described below is executed.

If a device newly connected by wire is the pairing subject device, the host device 10 subsequently transmits a transmission request for version information to the peripheral device 30 (S3). In response thereto, the peripheral device 30 transmits its own version information to the host device 10 (S4). Further, the host device 10 transmits a transmission request for the communication destination identification information of the peripheral device 30 to the peripheral device 30 (S5). In response thereto, the peripheral device 30 transmits the communication destination identification information that allows the peripheral device 30 itself to be identified as a communication partner in wireless communications (here, the Bluetooth device address of the peripheral device 30) to the host device 10 (S6).

Then, the host device 10 transmits the communication destination identification information that allows the host device 10 itself to be identified as a communication partner in wireless communications (here, the Bluetooth device address of the host device 10) to the peripheral device 30 (S7). The peripheral device 30, which has received the transmitted communication destination identification information, stores the communication destination identification information of the host device 10 in the nonvolatile memory within the storage section 32, and returns to the host device 10 a response to the effect that the communication destination identification information has been received (S8).

Subsequently, the host device 10 makes a request to the peripheral device 30 for verification of the communication destination identification information stored by the peripheral device 30 in Step S8 (S9). In response to the request, the peripheral device 30 returns the communication destination identification information of the host device 10 stored in Step S8 (S10). If it is verified that the communication destination identification information returned in Step S10 is correct, the host device 10 stores the communication destination identification information of the peripheral device 30 acquired in Step S6 in the nonvolatile memory within the storage section 12 (S11).

The processing steps heretofore have caused the host device 10 and the peripheral device 30 to exchange their respective minimum communication destination identification information required to perform wireless communications between them. After that, according to a general procedure based on the Bluetooth standard, a communication connection by wireless communication is established between the host device 10 and the peripheral device 30. That is, the host device 10 and the peripheral device 30 perform communications through a wireless connection by using the communication destination identification information of the peripheral device 30 stored in Step S10 and the communication destination identification information of the host device 10 stored in Step S8, respectively.

Figure 3:
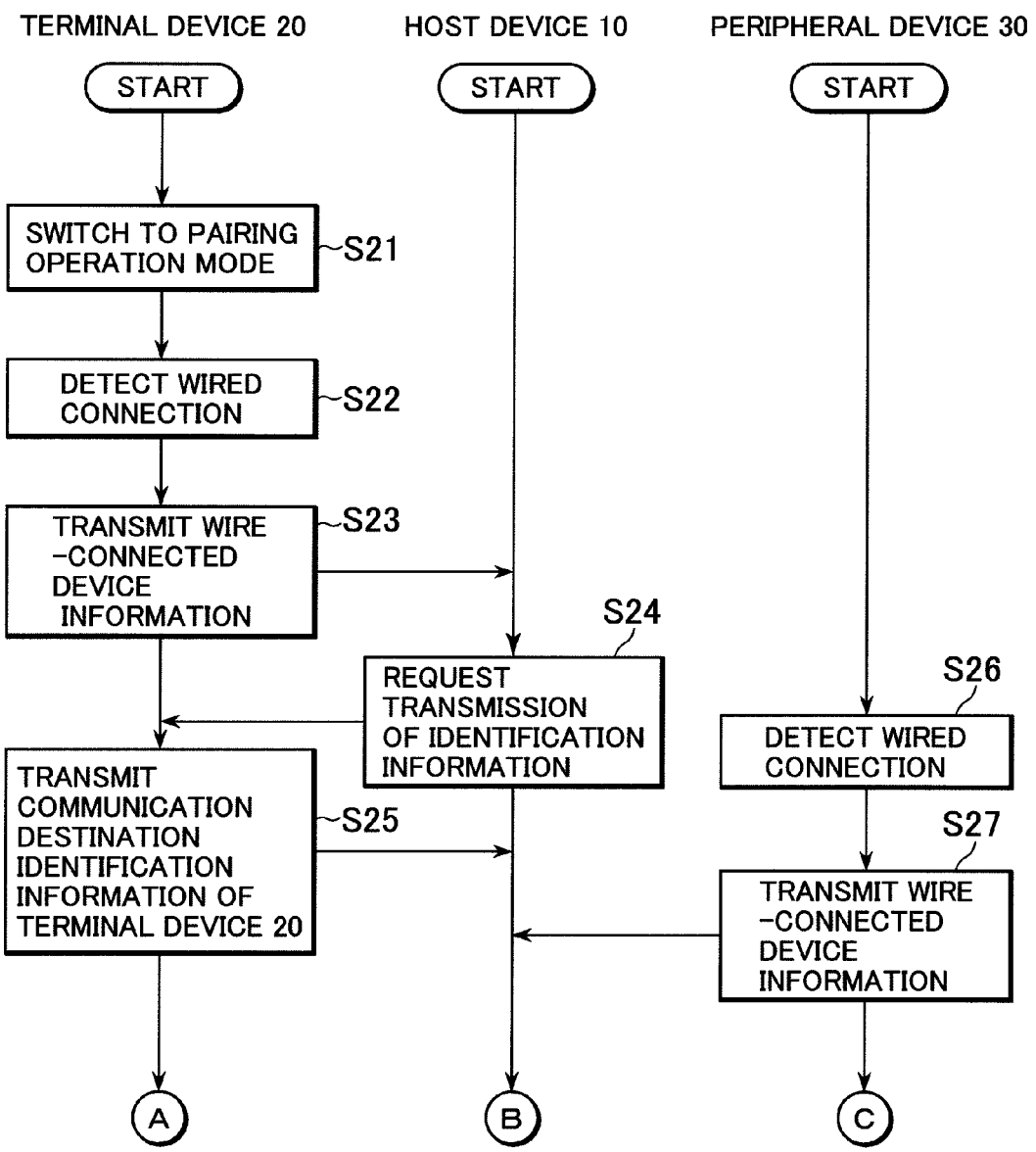
FIG. 3 is a flowchart illustrating an example of pairing processing between the terminal device and the peripheral device.

Next, by referring to flowcharts of FIG. 3 and FIG. 4, description is given of an example of the pairing processing between the terminal device 20 and the peripheral device 30 through the intermediation of the host device 10.

In this example, first, when the user performs an instruction operation with respect to the operation section 25 of the terminal device 20, the terminal device 20 thereby switches its own operation mode to a pairing operation mode (S21). Here, the operation mode represents a mode of regulating the operation of the terminal device 20 as a USB device. That is, when the terminal device 20 is connected to another device via the wired communication section 24, the terminal device 20 changes contents of the wire-connected device information on the terminal device 20 itself to be transmitted to the connected device depending upon the operation mode. Accordingly, the terminal device 20 can operate as a device whose type varies according to the operation mode.

To be specific, in this embodiment, the terminal device 20 starts an operation in a pairing operation mode or a storage operation mode according to the instruction operation performed by the user with respect to the operation section 25. The pairing operation mode is a mode for performing the pairing processing with the peripheral device 30 through the intermediation of the host device 10, and in this mode, the terminal device 20 establishes a connection by the USB interface with its own class of device in terms of the USB standard being set as the HID class. Meanwhile, in the storage operation mode, the terminal device 20 establishes a connection by the USB interface with its own class of device in terms of the USB standard being set as a mass storage class. That is, when connected to a USB host in the storage operation mode, the terminal device 20 functions as a storage device. Note that the terminal device 20 may be configured to change not only the class in terms of the USB standard but also the information on the provider/vendor of the device and on the model of the device, depending upon the operation mode. Accordingly, even when the same terminal device 20 is connected, the host device 10 judges that various types of device has been connected thereto according to the operation mode, and can execute processing by the device driver program or the like corresponding to each type of device.

When the pairing operation mode is started in Step S21, the terminal device 20 causes the display section 26 to display a message such as "Connect this device to the host device using the USB cable." In response to this message, when the user uses the USB cable or the like to wire connect the terminal device 20 and the host device 10, the terminal device 20 detects that the terminal device 20 itself has been wire connected to another communication device (S22). In response thereto, the terminal device 20 transmits the wire-connected device information on the terminal device 20 itself corresponding to the operation mode to the host device 10 (S23). Here, the terminal device 20 is set in the pairing operation mode in Step S21, and hence, as described above, the wire-connected device information includes the information indicating that the terminal device 20 is of the HID class.

The host device 10 executes the processing performed by the device driver program corresponding to the wire-connected device information transmitted in Step S23. Here, the device driver program corresponding to the information that indicates that the terminal device 20 is of the HID class is executed. Note that also in the example of the flow of FIG. 2 described above, the information indicating that the peripheral device 30 is of the HID class is transmitted from the peripheral device 30 in Step S2, with the result that the host device 10 executes the common device driver program even in the case where the peripheral device 30 is connected thereto or the case where the terminal device 20 operating in the pairing operation mode is connected thereto. Here, the host device 10 uses the information on the provider/vendor of the connected device and on the model of the connected device, which is included in the wire-connected device information, to judge the type of the connected device and execute processing corresponding to the judged type. That is, the host device 10 executes the above-mentioned pairing processing when the peripheral device 30 is connected thereto, and when the terminal device 20 operating in the pairing operation mode is connected thereto, performs the pairing relay processing described in the following.

That is, first, the host device 10 transmits a transmission request for the communication destination identification information of the terminal device 20 to the terminal device 20 (S24). In response thereto, the terminal device 20 transmits the communication destination identification information that allows the terminal device 20 itself to be identified as a communication partner in wireless communications (here, the Bluetooth device address of the terminal device 20) to the host device 10 (S25).

When the communication destination identification information is transmitted in Step S25, the terminal device 20 causes the display section 26 to newly display a message such as "Connect the host device and the peripheral device using the USB cable. If already connected, disconnect the USB cable and reconnect it." Meanwhile, the host device 10 waits for the peripheral device 30 to be connected to the wired communication section 14.

When the user wire connects the peripheral device 30 to the host device 10 by using the USB cable or the like in response to the message, in the same manner as Steps S1 and S2 of the flow of FIG. 2, the peripheral device 30 detects that the peripheral device 30 itself has been wire connected to another communication device (S26), and in response thereto, transmits the wire-connected device information on the peripheral device 30 itself to the host device 10 (S27).

The host device 10, which has received the wire-connected device information transmitted in Step S27, transmits a transmission request for the communication destination identification information of the peripheral device 30 to the peripheral device 30 (S28). In response thereto, the peripheral device 30 transmits the communication destination identification information that allows the peripheral device 30 itself to be identified as a communication partner in wireless communications (here, the Bluetooth device address of the peripheral device 30) to the host device 10 (S29). The processing steps of Steps S28 and S29 are the same as those of Steps S5 and S6 of the flow of FIG. 2.

Then, unlike the processing step of Step S7 of the flow of FIG. 2, the host device 10 transmits the communication destination identification information of the terminal device 20 acquired in the processing step of Step S25 (that is, the Bluetooth device address of the terminal device 20) to the peripheral device 30 (S30). The peripheral device 30, which has received the transmitted communication destination identification information, stores the communication destination identification information of the terminal device 20 in the nonvolatile memory within the storage section 32, and returns to the host device 10 a response to the effect that the communication destination identification information has been received (S31). The processing steps of Steps S30 and S31 are the same as those of Steps S7 and S8 of the flow of FIG. 2 except that the communication destination identification information of the terminal device 20 is transmitted instead of the communication destination identification information of the host device 10.

Note that, although description is omitted here, the host device 10 and the peripheral device 30 may also execute the same processing as confirmation processing for the version information performed in Steps S3 and S4 of the flow of FIG. 2, verification processing for the communication destination identification information performed in Steps S9 and S10, and the like in the flow of FIGS. 3 and 4. Accordingly, the peripheral device 30 may execute the same processing in both cases where the pairing is performed with the host device 10 and the pairing is performed with the terminal device 20, which allows both the pairing with the directly-connected host device 10 and the pairing with the indirectly-connected terminal device 20 to be realized without changing the contents of the program.

Meanwhile, the host device 10, which has received the response returned in Step S31, transmits the communication destination identification information of the peripheral device 30 acquired in Step S29 to the terminal device 20 (S32). The terminal device 20, which has received the transmitted communication destination identification information, stores the communication destination identification information of the peripheral device 30 in the nonvolatile memory within the storage section 22, and transmits to the host device 10 a response to the effect that the communication destination identification information has been received (S33). According to the processing steps described above, the peripheral device 30 stores the communication destination identification information of the terminal device 20, and the terminal device 20 stores the communication destination identification information of the peripheral device 30, with the result that the pairing between them has been performed. At a time when the processing step of Step S33 is executed, the terminal device 20 may cause the display section 26 to display a new message such as "The peripheral device has been registered in this device. Disconnect the USB cable connecting the host device and the peripheral device, and the USB cable connecting the host device and this device." Accordingly, the display on the terminal device 20 allows the user to confirm that the pairing processing has ended normally.

After that, in the same manner as the case where the pairing with the host device 10 is executed in the flow of FIG. 2, the peripheral device 30 establishes a communication connection by wireless communication with a device (here, the terminal device 20) identified by the communication destination identification information stored by the peripheral device 30. In addition, the terminal device 20 also stores the communication destination identification information of the peripheral device 30, and can therefore accept a connection by wireless communication from the peripheral device 30 identified by the communication destination identification information.

According to the embodiment described above, the terminal device 20 can perform the pairing processing with the peripheral device 30 that performs pairing by wired communication without directly establishing a connection with the peripheral device 30 by wired communication. In addition, with the connection to any one of the terminal device 20 and the peripheral device 30 as a trigger, the host device 10 can appropriately select any one of the pairing processing for the host device 10 itself and the pairing relay processing for another device.

Note that the embodiment of the present invention is not limited to the above-mentioned example. For example, in the above description, the wireless communications and the wired communications are performed based on the Bluetooth standard and the USB standard, respectively, but each device may be subjected to a communication connection based on another communication standard. For example, the host device 10 and the terminal device 20 may be connected based on a communication standard different from the standard for the communication connection established by the peripheral device 30 with the host device 10 upon the pairing processing. Further, in the above description, the device driver program corresponding to the HID class judges which of the pairing processing and the pairing relay processing is to be executed according to the type of the connected device, but the present invention is not limited thereto, and the host device 10 may execute independent programs that are different from each other according to the type of the device identified by the wire-connected device information, to thereby realize the pairing processing and the pairing relay processing.

Further, in the above description, the host device 10 including the wireless communication section 13 is allowed to establish a wireless communication connection with the peripheral device 30, but the present invention is not limited thereto, and the host device 10 may be configured to perform only the pairing relay processing of relaying the pairing between the terminal device 20 and the peripheral device 30 without performing the pairing between the host device 10 itself and the peripheral device 30. In this case, the host device 10 may not necessarily include the wireless communication section 13. FIG. 5 is a block diagram illustrating a configuration example of the host device 10 used in this case. In this example, the host device 10 executes the pairing relay processing as described above with reference to the flowcharts of FIGS. 3 and 4 when predefined devices to be subjected to the pairing relay processing (here, the terminal device 20 and the peripheral device 30) are connected thereto via the wired communication section 14. That is, when the terminal device 20 and the peripheral device 30 are connected via the wired communication section 14, the host device 10 transmits the communication destination identification information of the terminal device 20 acquired from the terminal device 20 to the peripheral device 30, and transmits the communication destination identification information of the peripheral device 30 acquired from the peripheral device 30 to the terminal device 20. Note that in this example, the host device 10 does not perform the pairing processing as illustrated in the flow of FIG. 2, and hence the pairing relay processing may be started, regardless of the order in which the terminal device 20 and the peripheral device 30 are connected to the wired communication section 14, with the connection to anyone or both of the devices as a trigger. Further, in the same manner as the above-mentioned example, the host device 10 may be configured to execute the pairing relay processing only when the terminal device 20 is connected thereto in the pairing operation mode, and to avoid execution of the pairing relay processing when the terminal device 20 operating in another operation mode is connected thereto. Note that regardless of the operation mode of the terminal device 20, the host device 10 may be configured to recharge the device that is connected thereto via the USB connection cable when each of the terminal device 20 and the peripheral device 30 is connected thereto via the wired communication section 14.

While there have been described what are at present considered to be certain embodiments of the invention, it is understood that various modifications may be made thereto, and it is intended that the appended claims cover all such modifications as fall within the true spirit and scope of the invention.

What is claimed is:

1. A communication system, comprising:
a host device;
a terminal device that can establish a communication connection with the host device; and
a peripheral device comprising:
a first communication section that can be connected to the host device; and
a second communication section that can be connected to the terminal device, wherein:
the terminal device comprises a section for transmitting terminal device identification information for identifying the terminal device to the host device as communication destination identification information that allows the peripheral device to identify a communication partner in a case of performing communications via the second communication section;
the host device comprises a communication destination identification information transmitting section for transmitting the terminal device identification information for identifying the terminal device to the peripheral device as the communication destination identification information when the host device is connected to the terminal device and connected to the peripheral device via the first communication section; and
the peripheral device further comprises a section for establishing a communication connection via the second communication section with the communication partner identified by the communication destination identification information transmitted by the communication destination identification information transmitting section;
wherein the peripheral device can be further connected to the host device via the second communication section; and
wherein the communication destination identification information transmitting section of the host device transmits host device identification information for identifying the host device to the peripheral device as the communication destination identification information when the host device is connected to the peripheral device via the first communication section without being connected to the terminal device.

2. A host device, which can establish a communication connection with a terminal device and can be connected to a peripheral device, that comprises a first communication section and a second communication section, via the first communication section,
    the host device comprising a communication destination identification information transmitting section for transmitting terminal device identification information for identifying the terminal device acquired from the terminal device to the peripheral device as communication destination identification information that allows the peripheral device to identify a communication partner in a case of performing communications via the second communication section, when the host device is connected to the terminal device and connected to the peripheral device via the first communication section;
    wherein the peripheral device can be further connected to the host device via the second communication section; and
        wherein the communication destination identification information transmitting section of the host device transmits host device identification information for identifying the host device to the peripheral device as the communication destination identification information when the host device is connected to the peripheral device via the first communication section without being connected to the terminal device.

3. A host device according to claim 2, wherein:
    the communication destination identification information transmitting section acquires peripheral device identification information that allows the host device to identify the peripheral device as the communication partner in the case of performing the communications via the second communication section, from the peripheral device when the host device is connected to the peripheral device via the first communication section without being connected to the terminal device; and
    the communication destination identification information transmitting section transmits, to the terminal device, the peripheral device identification information that allows the terminal device to identify the peripheral device as the communication partner in the case of performing the communications via the second communication section, and has been acquired from the peripheral device, when the host device is connected to the peripheral device via the first communication section while being connected to the terminal device.

4. A host device according to claim 2, wherein the communication destination identification information transmitting section transmits the terminal device identification information for identifying the terminal device to the peripheral device as the communication destination identification information when the host device is connected to the peripheral device via the first communication section while being connected to the terminal device operating in a predetermined operation mode.

5. A communication control method, which is performed by a host device that can establish a communication connection with a terminal device, and can be connected to a peripheral device that comprises a first communication section and a second communication section, via the first communication section,
    the communication control method comprising:
    transmitting terminal device identification information for identifying the terminal device acquired from the terminal device to the peripheral device as communication destination identification information that allows the peripheral device to identify a communication partner in a case of performing communications via the second communication section, when the host device is connected to the terminal device and connected to the peripheral device via the first communication section; and
    transmitting host device identification information for identifying the host device to the peripheral device as the communication destination identification information when the host device is connected to the peripheral device via the first communication section without being connected to the terminal device,
    wherein the peripheral device can be further connected to the host device via the second communication section.

6. A non-transitory computer-readable information storage medium, which stores thereon a program for causing a host device, that can establish a communication connection with a terminal device, and can be connected to a peripheral device that comprises
    a first communication section and a second communication section, via the first communication section, to function as a communication destination identification information transmitting section for transmitting terminal device identification information for identifying the terminal device acquired from the terminal device to the peripheral device as communication destination identification information that allows the peripheral device to identify a communication partner in a case of performing communications via the second communication section, when the host device is connected to the terminal device and connected to the peripheral device via the first communication section;
    wherein the peripheral device can be further connected to the host device via the second communication section; and
    wherein the communication destination identification information transmitting section of the host device transmits host device identification information for identifying the host device to the peripheral device as the communication destination identification information when the host device is connected to the peripheral device via the first communication section without being connected to the terminal device.

7. The communication system of claim 1, wherein the first communication section is a wired communication interface, the second communication interface is a wireless communication interface, and the host device and the terminal device are connected to each other by wire.

* * * * *